(12) United States Patent
Baquet et al.

(10) Patent No.: US 10,704,318 B2
(45) Date of Patent: Jul. 7, 2020

(54) INSULATING GLAZING UNIT, IN PARTICULAR FOR A CLIMATE CHAMBER

(71) Applicant: SAINT-GOBAIN GLASS FRANCE, Courbevoie (FR)

(72) Inventors: Erwan Baquet, Compiegne (FR); Romain Decourcelle, Margny les Compiegne (FR); Edouard Jonville, Courbevoie (FR); Yoann Machizaud, Lyons (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 11 days.

(21) Appl. No.: 16/085,889

(22) PCT Filed: Feb. 23, 2017

(86) PCT No.: PCT/EP2017/054180
§ 371 (c)(1),
(2) Date: Sep. 17, 2018

(87) PCT Pub. No.: WO2017/157637
PCT Pub. Date: Sep. 21, 2017

(65) Prior Publication Data
US 2019/0112866 A1    Apr. 18, 2019

(30) Foreign Application Priority Data

Mar. 18, 2016   (FR) ..................... 16 52350

(51) Int. Cl.
*E06B 3/663*   (2006.01)
*A47F 3/04*    (2006.01)

(52) U.S. Cl.
CPC ........ *E06B 3/66333* (2013.01); *A47F 3/0434* (2013.01); *E06B 3/66342* (2013.01);
(Continued)

(58) Field of Classification Search
CPC ............. E06B 3/66328; E06B 3/66333; E06B 3/66342; E06B 2003/6638;
(Continued)

(56) References Cited

U.S. PATENT DOCUMENTS

| | | |
|---|---|---|
| 6,035,602 A | 3/2000 | Lafond |
| 2012/0090253 A1* | 4/2012 | Beresford ........... E06B 3/66333 |
| | | 52/204.593 |

(Continued)

FOREIGN PATENT DOCUMENTS

| | | |
|---|---|---|
| DE | 20 2012 10402 U1 | 10/2013 |
| WO | WO 2014/198549 A1 | 12/2014 |

OTHER PUBLICATIONS

International Search Report as issued in International Patent Application No. PCT/EP2017/054180, dated Apr. 12, 2017.

*Primary Examiner* — Donald J Loney
(74) *Attorney, Agent, or Firm* — Pillsbury Winthrop Shaw Pittman LLP

(57) ABSTRACT

An insulating glazing includes two glass sheets spaced apart by an air- or gas-filled cavity, at least one spacer arranged at a periphery of the glass sheets and that keeps the glass sheets spaced apart, one of the spacers being transparent, made of transparent plastic and placed on one of the sides of the glazing, and a first leaktight barrier that is leaktight to water, formed by a structural seal, a material of which is watertight, and a second leaktight barrier that is leaktight to gases and to water vapor, the leaktight barriers being made of transparent material, wherein the spacer includes on at least one of its internal and external faces, the internal and external faces being respectively facing and on the opposite side from the gas-filled cavity, a coating which is thin and constitutes the second transparent barrier, the coating and the transparent spacer forming a single assembly.

19 Claims, 2 Drawing Sheets

(52) U.S. Cl.
CPC ... *E06B 3/66328* (2013.01); *E06B 2003/6638* (2013.01); *E06B 2003/66338* (2013.01); *Y02B 80/22* (2013.01)

(58) Field of Classification Search
CPC .......... E06B 2003/66338; Y02B 80/22; Y02B 80/24; A47F 3/0434
See application file for complete search history.

(56) References Cited

U.S. PATENT DOCUMENTS

| | | | | |
|---|---|---|---|---|
| 2015/0107167 A1* | 4/2015 | Baumann | ............ | E06B 3/66319 52/172 |
| 2015/0284987 A1* | 10/2015 | Lohwasser | .............. | B32B 27/08 428/34 |
| 2016/0120336 A1* | 5/2016 | Schneider | ............... | A47F 3/005 312/116 |

* cited by examiner

INSULATING GLAZING UNIT, IN PARTICULAR FOR A CLIMATE CHAMBER

CROSS-REFERENCE TO RELATED APPLICATIONS

This application is the U.S. National Stage of PCT/EP2017/054180 filed Feb. 23, 2017, which in turn claims priority to French patent application number 1652350 filed Mar. 18, 2016. The content of these applications are incorporated herein by reference in their entireties.

FIELD

The invention relates to an insulating glazing intended for a door of a climate-controlled, and in particular refrigerated, enclosure/unit, said glazing comprising at least two glass sheets that are spaced apart by at least one air- or gas-filled cavity by virtue of at least one spacer that is arranged at the periphery of the glass sheets, at least one spacer being made of transparent plastic and placed on at least one of the sides of the glazing.

The invention will more particularly be described with regard to an application to a refrigerated unit/display case, without however being limited thereto. The glazing of the invention may be used in any architectural application, any exterior-glazing application, any interior-glazing application, any partitioning application, etc.

BACKGROUND

A climate-controlled enclosure is more particularly intended to form a chiller unit or a freezer unit in which chilled or frozen products are respectively displayed, these products possibly being items of food or drinks or any other products that need to be kept cold—pharmaceutical products or flowers for example.

Although frozen products are increasingly being sold in units provided with what are called "cold" doors, comprising transparent insulating glazings, at the present time self-service fresh and ultra-fresh items of food are essentially sold in stores by means of vertical units that are open-fronted. Provided with a curtain of refrigerated air as the front face in order to isolate the items of food from the warm ambient environment of the store and to keep the items of food at their optimal preservation temperature, these units are quite effective from this point of view and, in the absence of physical barrier, allow products to be accessed directly, facilitating the act of purchase.

However, the absence of physical barrier in these vertical chiller units leads to substantial heat exchange between the ambient environment of the store and the much colder ambient environment generated inside these units, this having the following consequences:

- this heat exchange must be compensated for by greater refrigeration in order to guarantee temperatures that are optimal for the preservation of items of food in the unit, this disadvantageously increasing the power consumption of these units;
- the ambient environment of the store is considerably cooled locally (cold-aisle to effect), this leading to consumers avoiding venturing into these aisles except for essential purchases, reducing impulse buying. This local cooling of the aisles in question has grown worse over the last few years as the strictness of food-safety regulations has increased and led to the storage temperature of foodstuffs being further decreased;
- moist air from the ambient environment of the store is siphoned off by the cold-air curtain on the front face of the unit, this leading to a rapid saturation of the unit's heat exchanger (also called an evaporator) which ices up, which then significantly decreases the efficiency of the heat exchange. It is therefore necessary to frequently de-ice the evaporator, typically twice a day, this leading to an increased power consumption.

Confronted with these drawbacks, unit manufacturers have attempted to provide solutions, in particular involving optimizing the air curtains and heating the aisles with radiant heaters or hot-air blowers. The progress made with respect to customer comfort nevertheless remains limited, and is to the detriment of power consumption. Specifically, the heat produced by these heating systems, which guzzle power, also heats the units, and thereby leads in the end to even more power being consumed to refrigerate these units.

Providing these open-fronted units with conventional cold doors allows these drawbacks to be effectively addressed. However, these solutions, which are tried and tested in freezer units for frozen products, have been slow to be adopted in chiller units. These doors have the disadvantage of placing a physical barrier between the consumer and the self-service product, possibly having potentially negative effects on sales.

Furthermore, these doors are manufactured to a design similar to that of the windows used in buildings: a frame made of profiles, generally made of anodized aluminum for reasons of esthetics, resistance to aging and ease of manufacture, frames the entire periphery of a double or triple glazing. The frame is generally adhesively bonded directly to the periphery and to the external faces of the glazing; it participates in the rigidity of the structure and allows the interlayer means (spacers) placed at the periphery of the glazing and separating the glass sheets to be masked from sight.

However, such a structural frame significantly decreases the vision area of the glazing.

It has thus been proposed, to improve the vision area of glazings, to manufacture insulating glazings with transparent spacers at least on their vertical sides, furthermore creating a visual perception of a transparent surface continuity over all of the refrigerated glazings placed side-by-side with one another forming a display case.

The spacers are fastened with adhesives such as acrylic adhesives, which furthermore perform a watertight function, the adhesive being at the interface between the spacer and the internal face of the glass sheets of the glazing. To perfect the sealing, a transparent additional seal is sometimes added such as a silicon seal positioned on the external side of the air-filled cavity of the glazing, on the edge of the spacer and between the two glass sheets.

The addition of a second leaktight barrier in particular made of silicone supplements the leaktightness by providing leaktightness not only to water but also leaktightness to gases and to water vapor. Specifically, certain plastics from which the transparent spacer is made are not completely leaktight to gases and to water vapor.

However this additional seal, although transparent, generates a negative visual impact for the consumer facing, and above all positioned angularly to, a refrigerated enclosure with such a glazing.

SUMMARY

The objective of the invention is therefore to produce an insulating glazing for a climate-controlled enclosure that obviates the various aforementioned drawbacks, by providing leaktightness to water but also by optimizing the leaktightness to gases and to water vapor, while providing the biggest possible field of vision through the glazing, a person facing a refrigerated enclosure having a plurality of vertical glazings placed side-by-side laterally with one another having to have the impression of a continuous glass surface without the presence of vertical discontinuities.

According to the invention, the insulating glazing intended for a door of a climate-controlled, and in particular refrigerated, enclosure, comprises at least two (parallel) glass sheets that are spaced apart by at least one air- or gas-filled cavity, at least one spacer that is arranged at the periphery of the glass sheets and that keeps the two glass sheets spaced apart, at least one spacer being made of transparent plastic and placed on at least one of the sides of the glazing, and also a first barrier that is leaktight to water, formed by at least one structural seal, the material of which is watertight (the structural seal having the role of structurally fastening the spacer to the glass sheets), and a second barrier that is leaktight to gases and to water vapor, the two leaktight barriers being made of transparent material, characterized in that the transparent spacer comprises on at least one of its internal and external faces, the internal and external faces being respectively facing and on the opposite side from the gas-filled cavity, a coating which is thin and constitutes the second transparent barrier that is leaktight to gases and to water vapor, the coating and the spacer forming a single assembly.

The term "constitutes" with regard to the coating and its leaktightness is not used here in the sense necessarily of exclusivity, but in the sense of "forms", "is a part of", the second leaktight barrier. Other elements forming the second leaktight barrier may be combined as described below as regards a supplementary barrier that is leaktight to gases and to water vapor.

The term "thin" is understood to mean a thickness of at most 500 µm. The thin transparent coating that is leaktight to gases and to water vapor has a thickness preferably of between 2 nm and 200 µm.

The expression "single assembly" is understood to mean the fact that the spacer and its coating form a single assembly independent of the glazing before the joining thereof to the latter, this assembly being obtained during the manufacture of the spacer or just before the assembly thereof with the glazing. The spacer therefore already comprises its coating when the spacer is fitted in the glazing. The coating is an integral part of the spacer. The spacer thus incorporates the function of leaktightness to gases and to water vapor.

Consequently, a leaktightness to gases and to water vapor is guaranteed with transparent means that, due to their extremely thin thickness, a thickness that is imperceptible or virtually imperceptible to the naked eye, does not disrupt the transparent visual impression that the entire glazing must give, in particular at the join of two glazings abutted by their vertical sides comprising the transparent spacers.

The transparent spacer of these glazings being made of plastic, and most of the plastics used are not generally sufficiently homogeneous so that they are permeable to water vapor and to gases. By combining the plastic spacer, in a monoblock manner, with the transparent thin coating that is leaktight to gases and to water vapor, the spacer of the invention guarantees the function of leaktightness to gases and to water vapor without requiring thick beads of silicone as in the prior art which are added to the external face of the spacer between the two glass sheets.

The thin coating is a film added to the spacer or a deposited thin layer. Its thickness, which does not exceed 500 µm, is especially linked to the type of material used (thin layer or film) and to its manufacturing process.

In the case of a deposited thin layer, this layer is deposited by any known techniques, such as by a magnetron process, evaporation process, or else a wet-coating process.

The transparent thin coating that is leaktight to gases and to water vapor is, as a preferred example, made of silicon oxide, or aluminum oxide or else polysilazane.

The thin coating covers the internal and/or external face, and in addition the corners of the internal and/or external face by extending onto the adjacent faces (referred to as spacer-fastening faces) which are parallel to the glass sheets.

The thin coating preferably covers the internal face of the spacer, which is facing the air-filled cavity, i.e. on the inside of the insulating glazing.

As a variant, the thin coating covers only the external face of the spacer.

The thin coating may cover the two internal and external faces, or else all the faces of the spacer.

The transparent spacer is made of plastic, for instance made of SAN (styrene-acrylonitrile) or of PETg (glycolized polyethylene terephthalate) or of PMMA (polymethyl methacrylate), or of polycarbonate.

The spacer is bulk or hollow. By being hollow, it more particularly improves the thermal insulation performance of the glazing.

The watertightness is achieved by means of the barrier made by the structural seal that fastens the spacer to the glass sheets. This structural seal is placed at the interface between each glass substrate and the opposite face of the spacer. It is made of an adhesive and watertight transparent material, such as acrylic or silicone, which is optionally crosslinkable under the action of ultraviolet rays.

The structural seal does not necessarily need to extend over the entire thickness of the spacer. The expression "thickness of the spacer" is understood to mean the dimension to extending parallel to the glass sheets and in a horizontal plane in the fitted position of the glazing.

In order to perfect the leaktightness to gases and to water vapor, a supplementary barrier that is leaktight to gases and to water vapor and that is transparent, in addition to the one incorporated into the spacer (via the coating) is added between the spacer and each glass sheet.

This supplementary barrier is positioned at the interface between each fastening face of the spacer and each glass sheet, and/or limited to perpendicular to the interface between the corners of the spacer and the glass sheets and/or arranged over the entire width separating the two glass sheets on the external face side of the spacer.

This supplementary barrier that is leaktight to gases and to water vapor is preferably made of butyl rubber.

At the interface or perpendicular to the interface between the glass sheets and the spacer, the supplementary barrier that is leaktight to gases and to water vapor is advantageously thin with a width equivalent to the interface. Even if the material of the supplementary barrier is transparent, such a placement and so thin a thickness, combined with the transparent leaktight coating of the spacer, minimize the presence of materials capable of affecting the desired transparency effect.

Moreover, the basic embodiment of the invention (coating attached to the spacer on the internal and/or external face) or the latter with a supplementary barrier at the interface or limited to perpendicular to the interface, makes it possible to position the external face of the spacer in a coplanar or virtually coplanar manner with the edge of the glass sheets, maximizing the vision area through the glazing.

The thickness of the supplementary barrier is equivalent to that of the structural seal, in particular from a few micrometers to 2 mm.

At the interface between the glass sheets and the spacer, the supplementary barrier is positioned, being abutted and aligned with the structural seal.

Of course, the supplementary barrier may extend over the whole of the width separating the two glass sheets from the external face side of the spacer, in the style of a supplementary transparent sealing means placed between the glass sheets and on the opposite side from the gas-filled cavity. However, this embodiment would not be preferred since it affects the transparent refined perception of the basic embodiment of the invention. Moreover, this embodiment does not make it possible to position the external face of the spacer in a coplanar manner with the edge of the glass sheets; yet the spacer by being sunken between the glass substrates as little as possible and by being coplanar with the edge of the substrates gives a maximized transparency effect.

According to another feature, the glazing is a double glazing or triple glazing.

According to yet another feature, the glazing is advantageously provided with one or more low-emissivity coatings and/or an antifog or anti-frost layer, thus avoiding conventional heating means, this helping to save energy.

Lastly, the invention relates, on the one hand, to a door comprising a glazing according to the invention, and on the other hand, to a climate-controlled enclosure, of the refrigerated unit type, comprising a door or a glazing according to the invention, or a plurality of glazings of the invention that are placed side-by-side with one another, the transparent spacers being provided at least on the abutted-together sides of the glazings.

BRIEF DESCRIPTION OF THE DRAWINGS

The present invention is now described using merely illustrative and non-limiting examples of the scope of the invention, and with regard to the appended drawings, in which.

DETAILED DESCRIPTION

The figures are not to scale for the sake of readability.

Figure 1:
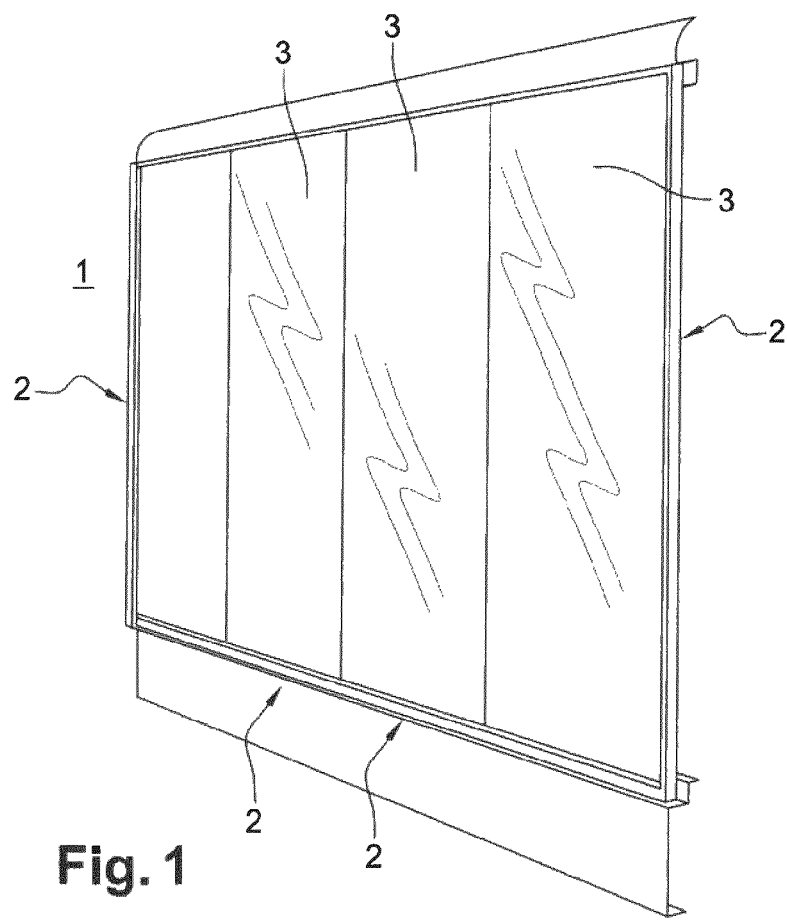
FIG. 1 illustrates a perspective view of a front of a refrigerated unit incorporating a plurality of glazings according to the invention.

The climate-controlled unit 1 schematically illustrated in FIG. 1 comprises a plurality of doors 2 each comprising an insulating glazing 3 according to the invention.

The unit is for example a refrigerated chiller unit intended to be installed in a store aisle. It is thus possible, according to the invention, to form a unit with a row of doors that are laterally abutted vertically along their edge faces.

In the case of a chiller unit/display case, since leaktightness is less critical than for a freezer unit, the door of the invention comprising the insulating glazing of the invention has no need to comprise vertical jambs forming a frame and provided with thick seals at the junction of two abutted doors/glazings. The glazing of the invention thus allows, because of the transparency of its vertical edges, a continuous transparent area to be achieved when glazings are placed side-by-side via their edge faces.

Each insulating glazing comprises at least two glass sheets that are held parallel and spaced apart by a frame the opposite vertical portions of which, in the mounted position of the glazing, are transparent.

The front of the glazings and therefore of the unit is thus devoid of any structural frame and has a virtually smooth glass-wall-like appearance. In this way vision area is increased.

Only the transparent vertical portion of the frame of the glazing, i.e. the portion corresponding to the invention, will be described below, the horizontal portions generally being formed by conventional interlayer means and leakfight means that are not transparent. Likewise, the door that incorporates the glazing, the hinging means, the profiles for supporting and hiding the hinging means, and the type of handle will not be described.

Figure 2:
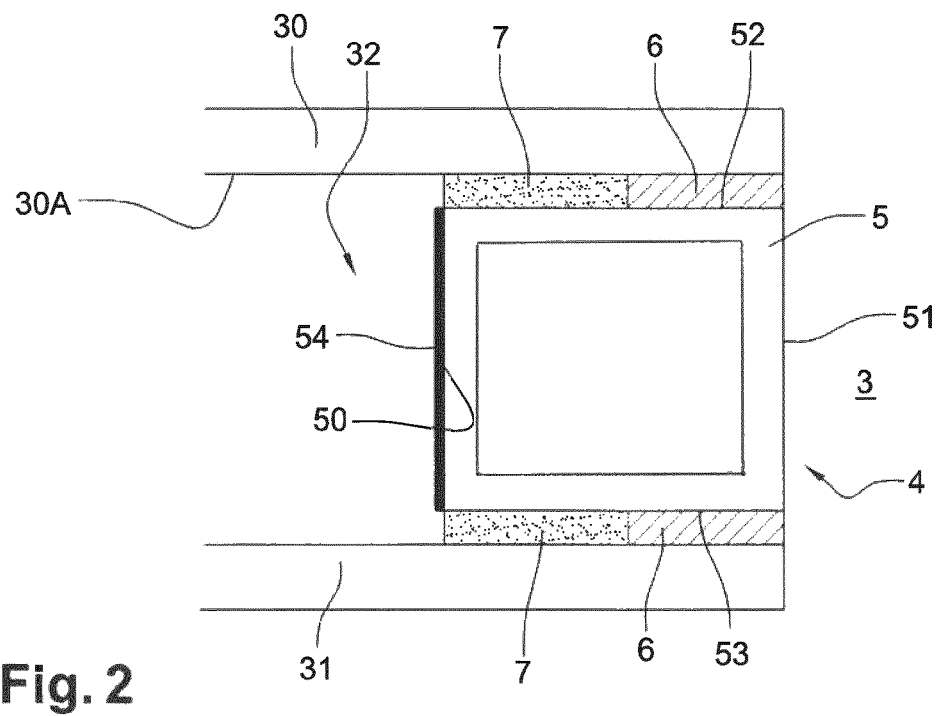
FIG. 2 is a partial schematic cross-sectional and top view of a glazing of the invention.

FIG. 2 illustrates a partial top view of the insulating glazing 3 showing the transparent vertical inner portion 4 of the frame. The insulating glazing illustrated is a double glazing with two glass sheets. In the case of a triple glazing with three glass sheets, the glazing would comprise two transparent portions 4 according to the invention.

The glazing 3 comprises two glass sheets 30 and 31 that are parallel and spaced apart by means of an interlayer element or spacer 5.

The glass sheets 30 and 31 are preferably made of tempered glass. The thickness of each of the glass sheets is between 2 and 5 mm, and is preferably 3 or 4 mm in order to minimize the overall weight of the glazing and to optimize the transmission of light.

The glass sheets are separated from each other by the spacer 5 in order to produce, therebetween, a volume forming a gas-filled cavity 32.

The gas-filled cavity 32 has a thickness of at least 4 mm and is modified depending on the desired performance in terms of the heat-transfer value U, but is no thicker than 16 mm, or even than 20 mm.

The gas-filled cavity is filled with air or, preferably, in order to increase the level of insulation of the glazing, a noble gas, chosen from argon, krypton, xenon, or a mixture of these various gases, the noble gas making up at least 85% of the gas mixture filling the cavity. For an even further improved U value, it is preferable for the cavity to be filled with at least 92% krypton or xenon.

The spacer 5 preferably has a low thermal conductivity, having a thermal conductivity coefficient of at most 1 W/m·K, preferably less than 0.7 W/m·K, and even less than 0.4 W/m·K.

The spacer has a body made of transparent plastic, of styrene-acrylonitrile (SAN) or polypropylene type for example.

The spacer 5 is of generally parallelepipedal shape and has four faces, a face called the internal face 50 facing the gas-filled cavity, an external opposite face 51 facing the exterior of the glazing, and two what are called fastening faces 52 and 53 facing the respective glass sheets 30 and 31. The spacer may in particular have, on its internal face 50, a profile with sections cut toward the corners (not illustrated). The spacer may be hollow as illustrated schematically in FIG. 2.

The spacer 5 extends lengthwise (here not shown) over the entire length of each of the at least vertical sides of the glazing.

The spacer has a width (dimension transverse to the general faces of the glass sheets) equivalent to the desired spacing of the glass sheets.

The spacer has a thickness, distance separating the internal 50 and external 51 faces (between the edge of the glazing and the gas- or air-filled cavity), which is equivalent to the width if the spacer has a square cross section, or which may in particular be smaller.

Preferably, the spacer has a thickness of between 3 and 16 mm between glass and gas-filled cavity.

The spacer 5 is fastened by adhesive bonding via its fastening faces 52 and 53 against the respective internal faces 30A and 31A of the glass sheets 30 and 31, by means of a structural seal 6 that furthermore provides watertightness.

The material of the structural seal 6 is transparent and watertight, for example made of silicone or acrylic.

The structural seal 6 is for example a double-sided adhesive tape.

The thickness (dimension extending between the spacer and the glass sheets) of the structural seal 6 is between a few micrometers and 2 mm depending on the nature of the material as regards its bonding ability in particular.

The structural seal 6 extends over the length of the spacer on one side of the glazing, and along a limited width of each fastening face 52 and 53 of the spacer.

The structural seal 6 is positioned, with regard to FIG. 2, so as to open from the external side of the glazing.

Preferably, the spacer 5 via its external face 51 and each structural seal 6 at the interface with each glass sheet are coplanar with the edge of the glass sheets.

The glazing furthermore comprises a transparent barrier that is leaktight to gases and to water vapor.

According to the invention, the barrier that is leaktight to gases and to water vapor consists of a thin coating 54 made of a material that is leaktight to gases and to water vapor attached to the internal face 50 and/or external face 51 of said spacer.

With regard to FIG. 2, the thin coating 54 is attached to the internal face 50 of the spacer 5.

Figure 3A:
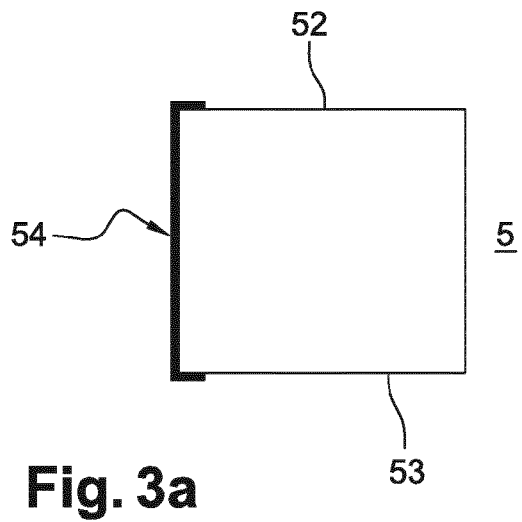
FIGS. 3a to 3d are schematic views of positioning variants of the thin leaktight coating of a spacer according to the invention, it being possible for the spacer to be bulk or hollow.

With regard to the variant from FIG. 3a, the coating 54 may cover one of the internal or external faces and the corners of the spacer by extending onto the fastening faces 52 and 53.

Figure 3B:
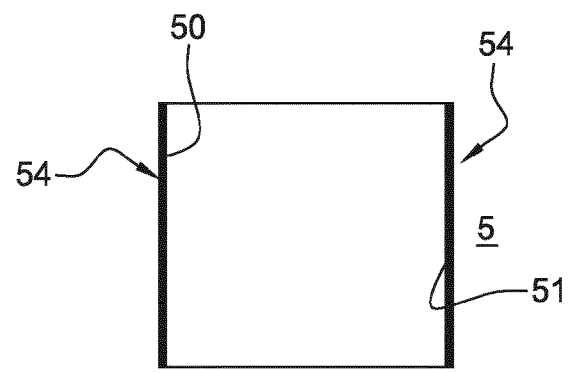

FIG. 3b illustrates the variant for which the coating 54 is both on the internal face 50 and external face 51.

Figure 3C:
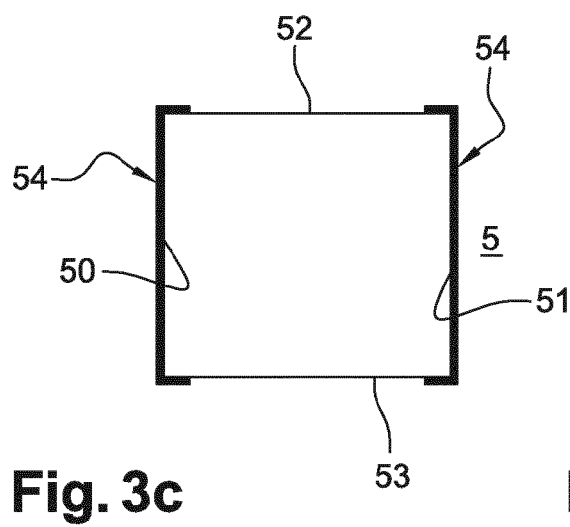

FIG. 3c corresponds to FIG. 3b, the coating 54 extending onto the fastening faces.

Figure 3D:
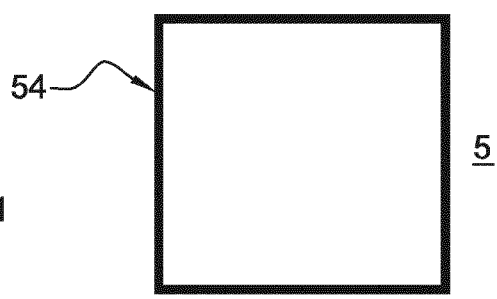

FIG. 3d illustrates a variant for which the coating covers all the faces of the spacer.

This coating is thin, preferably with a thickness of between 2 nm and 200 µm.

The thin coating is a film added to the spacer or a deposited thin layer. Its thickness is above all linked to the type of material used and to the process for manufacturing same.

In the case of a deposited thin layer, this layer is deposited by any technique, such as by a magnetron process, evaporation, or else a wet-coating process.

The transparent thin coating that is leaktight to gases and to water vapor is, as a preferred example, made of silicon oxide, or aluminum oxide or else polysilazane.

Owing to the very thin thickness of the coating 54, when this is incorporated with the spacer, it is imperceptible to the naked eye, which does not disrupt the transparent visual impression that the entire glazing must give, in particular at the join of two glazings abutted by their vertical sides comprising the transparent spacers.

Furthermore, the glazing advantageously comprises supplementary means 7 that are leaktight to gases and to water vapor, which are positioned at least at the interface and/or perpendicular to the interface between each glass sheet 30 and 31 and the fastening faces 52 and 53 of the spacer.

FIG. 2 illustrates the preferred example of the leaktight means 7 arranged at the interface between each glass sheet 30 and 31 and the fastening faces 52 and 53 of the spacer.

The leaktight means 7 extend on the one hand over the length of the spacer, and on the other hand along a portion of the width of the spacer, being abutted and aligned with each watertight structural seal 6.

The supplementary leaktight means 7 open from the internal side of the glazing facing the gas-filled cavity 32, preferably without going beyond the internal face 50 of the spacer.

The leaktight means 7 are preferably made of butyl rubber.

The leaktight means 7 have a thickness equivalent to that of the structural seal 6.

This embodiment from FIG. 2 makes it possible to place the spacer coplanar with the edge of the glass sheets. Consequently, the transparent portion 4 of the frame thus created provides leaktightness while very greatly minimizing the visual impact, no thickness of sealing material indeed being present transversely to the glass sheets, between the glass sheets and at the edge of the glazing.

The function of leaktightness to gases and to water vapor is guaranteed over the entire edge face of the glazing with no visual disturbance owing, on the one hand, to the transparent ultra-thin coating 54 attached to the edge of the spacer and to the thin thickness of the supplementary leaktightness means 7 limited to the interface or perpendicular to the to interface between the spacer and the glass sheets.

The invention claimed is:

1. An insulating glazing comprising at least two glass sheets that are spaced apart by at least one air- or gas-filled cavity, at least one spacer that is arranged at a periphery of the two glass sheets and that keeps the two glass sheets spaced apart, the at least one spacer being a transparent spacer made of transparent plastic and placed on at least one of the sides of the glazing, and a first leaktight barrier that is leaktight to water, formed by at least one structural seal, a material of which is watertight, and a second leaktight barrier that is leaktight to gases and to water vapor, the first and second leaktight barriers being made of transparent material, and wherein the transparent spacer comprises on at least one of its internal and external faces, the internal face and facing the gas-filled cavity and the external face being opposite the internal face and facing an exterior of the insulating glazing, a transparent thin coating which has a thickness of at most 500 µm and constitutes the second transparent leaktight barrier that is leaktight to gases and to water vapor, the transparent thin coating and the transparent spacer forming a single assembly.

2. The glazing as claimed in claim 1, wherein the transparent thin coating is a film added to the spacer or a deposited thin layer.

3. The glazing as claimed in claim 1, wherein the transparent thin coating is made of silicon oxide, or aluminum oxide or polysilazane.

4. The glazing as claimed in claim 1, wherein the transparent thin coating covers the internal and/or external face, and in addition corners of the internal and/or external face by extending onto spacer-fastening faces which are parallel to the glass sheets, or the transparent thin coating covers all the faces of the spacer.

5. The glazing as claimed in claim 1, wherein the transparent spacer is made of plastic of SAN (styrene-acrylonitrile) type or of PETg (glycolized polyethylene terephthalate) or of PMMA (polymethyl methacrylate), or of polycarbonate.

6. The glazing as claimed in claim 1, wherein the transparent spacer is bulk or hollow.

7. The glazing as claimed in claim 1, wherein the structural seal positioned at an interface between each glass sheet and the opposite face of the spacer, and is made of an adhesive and watertight transparent material.

8. The glazing as claimed in claim 1, further comprising a supplementary leaktight barrier which is positioned at an interface between each fastening face of the spacer and each glass sheet, and/or limited to perpendicular to an interface between corners of the spacer and the glass sheets and/or arranged over an entire width separating the two glass sheets on an outer face of the spacer.

9. The glazing as claimed in claim 1, further comprising a supplementary leaktight barrier which is positioned at an interface between each fastening face of the spacer and each glass sheet, being abutted and aligned with the structural seal, a thickness of the supplementary barrier being equivalent to that of the structural seal.

10. The glazing as claimed in claim 1, wherein the glazing is a double glazing or triple glazing.

11. The glazing as claimed in claim 1, wherein the glazing is provided with one or more low-emissivity coatings and/or an anti-fog or anti-frost layer.

12. A door comprising a glazing as claimed claim 1.

13. A climate-controlled unit comprising at least one door as claimed in claim 12.

14. The glazing as claimed in claim 1, wherein the thickness of the transparent thin coating that is leaktight to gases and to water vapor is between 2 nm and 200 µm.

15. The glazing as claimed in claim 2, wherein the deposited thin layer is deposited by a magnetron process, evaporation process, or else a wet-coating process.

16. The glazing as claimed in claim 7, wherein the structural seal is made of acrylic or silicone, which is optionally crosslinkable under the action of ultraviolet rays.

17. The glazing as claimed in claim 9, wherein the thickness of the supplementary barrier is from a few micrometers to 2 mm.

18. A climate-controlled unit comprising a plurality of glazings as claimed in claim 1, the plurality of glazings being placed side-by-side with one another, the transparent spacers associated with the plurality of glazings being placed at least on the sides abutted to one another of the glazings.

19. The glazing as claimed in claim 1, wherein the second leaktight barrier is provided on the internal face.

* * * * *